INVENTOR.
RAYMOND L. DILLS
BY
Richard L. Caslin
HIS ATTORNEY

March 6, 1962 R. L. DILLS 3,024,344
OVEN THERMOSTAT PROTECTOR
Filed Oct. 3, 1960 2 Sheets-Sheet 2
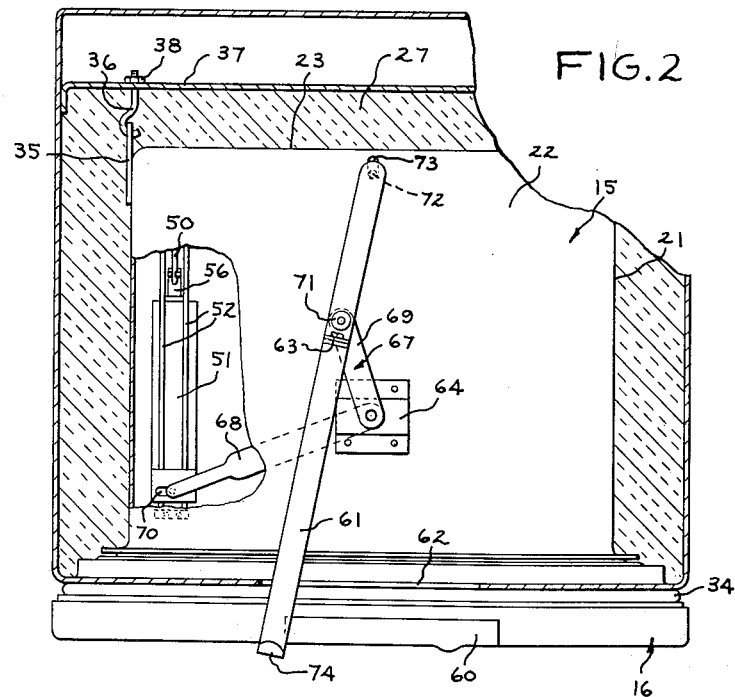
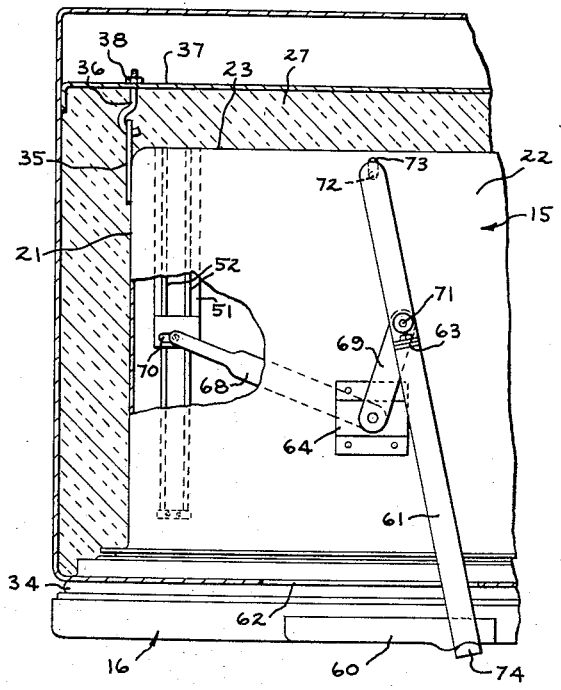
INVENTOR.
RAYMOND L. DILLS
BY Richard L Caslin
HIS ATTORNEY

United States Patent Office 3,024,344
Patented Mar. 6, 1962

3,024,344
OVEN THERMOSTAT PROTECTOR
Raymond L. Dills, Louisville, Ky., assignor to General Electric Company, a corporation of New York
Filed Oct. 3, 1960, Ser. No. 59,942
4 Claims. (Cl. 219—35)

The present invention relates to range ovens for domestic use and particularly to an automatic means of protecting a thermostat bulb in a domestic oven, where the automatic means is actuated by latching the oven door before the oven temperature is made to rise above about 600° F.

Hydraulic thermostats having an elongated bulb or probe formed on the end of a capillary tube that is joined to a bellows or diaphragm within the thermostat housing have been widely used as oven thermostats for many years. The normal oven cooking temperatures have all been below about 550° F. maximum, and a thermally responsive fluid used in the hydraulic control system has been able to withstand this degree of temperature without difficulty, but the known thermally responsive fluids cannot be operated at temperatures much above this value.

This invention contemplates the provision of a protective arrangement for the thermally responsive fluid so that a thermostat of the hydraulic type may be used successfully as a control element in the high temperature oven described in the co-pending application of Bohdan Hurko, Serial No. 27,926, filed May 9, 1960, which application is assigned to the General Electric Company, the assignee of the present invention. As there described and claimed the oven is provided with an automatic cleaning cycle where the temperature of the oven is raised to a heat cleaning temperature within the range of 750° F. and 950° F. so as to burn off all food soil and leave the walls of the oven cavity perfectly clean.

My invention is an improvement over the thermostatic bulb shielding means claimed in the co-pending application of Christian A. Eff, Serial No. 48,002, filed August 22, 1960, which application is also assigned to the same assignee as is the present invention.

The principal object of the present invention is to provide for the automatic control of the shielding means for the bulb of a hydraulic thermostat so that when the oven controls are set to raise the temperature of the oven above the normal cooking temperature the shielding means will be moved automatically into a protective relation over the bulb.

A further object of the present invention is to protect the bulb of a hydraulic thermostat by connecting the door latch with a shielding means for the bulb so that when the door is latched in preparation for raising the temperature to the heat cleaning range, the shielding means will automatically move into a protective position over the bulb.

The present invention is incorporated in an oven which has a controlled heating means capable of elevating the oven temperature to a level greatly in excess of 600° F. in accordance with the disclosure of the aforementioned co-pending application of Bohdan Hurko. The heating means is controlled by a hydraulic thermostat that has a fixed bulb filled with a thermally responsive liquid arranged to be placed in a heat sensitive position within the oven. During normal cooking operations the thermostat bulb is not only subject to heating by convection but also to the radiant heat energy of the heating means of the oven. Before the range controls are set to place the oven in an automatic heat cleaning cycle the oven door is closed and latched so that the door may not be opened while the heat cleaning cycle is in progress. The latch mechanism is connected to a shielding means whereby the shield automatically moves over the thermostat bulb when the door is latched for preventing excessive temperature rise of the fluid within the bulb and damage to the metal used in the bulb construction.

This invention is an improvement over the invention of the previously mentioned Eff application because of the inclusion of the safety means to insure that the housewife will not forget to shield the thermostat bulb before the range is regulated to initiate a heat cleaning cycle. In a heat cleaning oven it is of primary importance to latch the door before the oven temperature is raised above the normal cooking temperature to insure that the oven may not be opened before the completion of the heat cleaning cycle, otherwise a flash fire or small explosion might occur.

My invention will be better understood from the following description taken in connection with the accompanying drawings and its scope will be pointed out in the appended claims.

FIGURE 2 is a top plan cross-sectional view taken on a horizontal plane just above the top of the oven door showing the linkage mechanism for connecting the shielding means for the thermostat bulb and the latch means for the oven door.

FIGURE 3 is a cross-sectional plan view similar to that of FIGURE 2 showing the latch mechanism moved to its opposite extreme position where the door is latched, the bulb is protected by the shielding means, and the oven is ready to commence its heat cleaning cycle.

Figure 1:
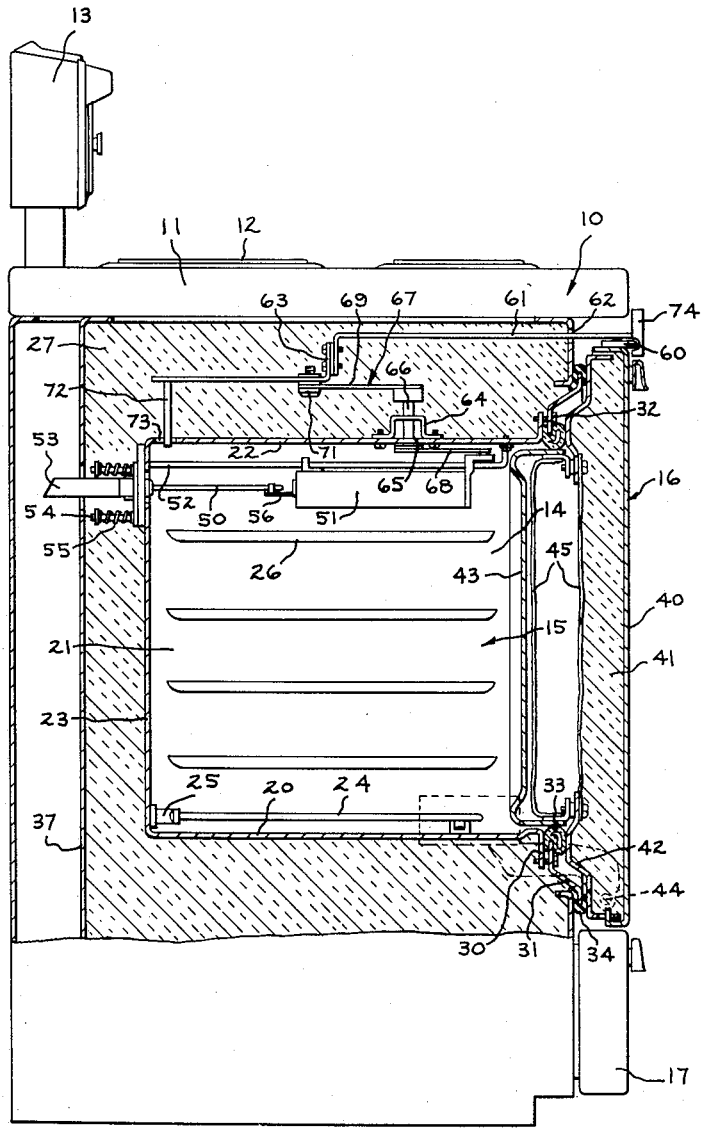
FIGURE 1 is a side elevational view partly in cross-section of a free-standing electric range embodying the present invention.

Referring in detail to the drawing and in particular to FIGURE 1, this invention has been shown in one form as applied to a free-standing electric range 10 but it should be understood that this is for illustrative purposes only and that the invention is broad enough to be used in all domestic ovens whether they be heated by gas or electricity. The range 10 includes a top cooking surface 11 having a plurality of surface heating elements 12, a backsplasher 13 containing the manually adjustable control devices for the range, an oven cavity 14 formed by an oven liner 15, a front opening drop door 16, and finally a lower storage drawer 17 positioned below the oven cavity for ease in storing pots and pans. The present invention is centered around the oven so that no further description will be given of the other features of the range which form no part of the present invention.

The oven liner 15 is a box-like construction having a bottom wall 20, two parallel side walls 21, a top wall 22, and a back wall 23. The front wall of the oven liner is open and this opening is closed by the front door 16. As in standard electric ovens there is a lower heating element or bake unit 24 and an upper heating element or broil unit (not shown). Both the bake and broil units are plug-in units that are inserted into connectors 25 positioned in openings in the back wall 23 of the oven liner as is well understood in this art. A series of vertically spaced horizontally extending embossments 26 are formed on the vertical side walls 21 of the oven liner to serve as rack supports at various heights within the oven cavity 14 so as to make it possible to move the racks (not shown) and vary the distance between the food and the two top and bottom heating elements. The oven liner 15 is surrounded by a relatively thick blanket of insulation 27 formed of suitable material such as fiberglass for preventing the escape of heat from the oven cavity as well as to hold down the operating temperature of the outer surface of the range body 10.

The front of the oven liner 15 includes an outwardly directed flange or collar 30 for cooperation with a breaker frame 31 that is of generally rectangular shape and is connected to the flange by means of fastening screws 32. This breaker frame 31 is formed of metal that has a generally Z-shape cross-section and both the inner and outer edges of the frame are covered with insulating gaskets. The innermost edge is provided with gasket 33 of fiberglass or the like material for withstanding the high oven temperatures during the heat cleaning cycle. The outermost edge of the breaker frame supports gasket 34 of silicone rubber material or the like. The function of these gaskets is to insulate the breaker frame from the oven liner 15 on the oven door 16 as well as to retard the heat transfer from the oven liner to the door on the range body.

As shown in FIGURES 2 and 3 the back portion of the oven liner 15 is provided with a pair of apertured plates 35 which cooperates with an adjustable hook member 36 that extends through an opening in a back panel 37 of the range body. There is an adjustable hook member or J-bolt 36 at each side of the oven liner and each hook includes a nut 38 so that the oven liner may be inserted through the front opening of the range body and the nuts 38 tightened on the hook members until the oven liner is supported by tension exerted by the hooks 36 whereby the breaker frame 31 is tensioned within the front opening of the range body and held rigidly therein.

As seen in FIG. 1, the oven door 16 is constructed with an outer decorative panel 40, intermediate insulation 41, and an inner boundary frame 42 supporting an inner door liner 43 which is adapted to extend into the oven cavity 14 when the door is closed. The door is hinged along its bottom edge to the range body by hinge means 44 so that the door is capable of dropping open to an extreme horizontal open position to form a shelf as in conventional oven designs. Also, counter-balancing means (not shown) would be provided for the door to facilitate the ease of opening and closing the door. The inner door panel or door liner 43 has only limited metal contact with the inner boundary frame 42 to limit the heat conduction between these parts. Also, the outer surface of the inner door liner 43 is provided with a pair of heat reflective surfaces 45 such as strips of aluminum foil or the like to further restrict the transfer of heat from the oven cavity through the door structure.

The detailed description of the oven which has been given above does not form part of the present invention but is merely recited herein in order to explain the environment of the present invention for a clear understanding of the problems and solutions found herein.

The oven shown in FIGURE 1 includes a thermostat bulb 50 supported from an opening in the back wall 23 of the oven liner near the top thereof and adjacent the left hand corner as seen when facing the front of the oven liner and looking into the oven cavity. The capillary tube joining this bulb 50 with the thermostat located in the backsplasher 13 is not shown although it is understood that the bulb must be connected by such a tube so that the expansion and contraction of the fluid within the bulb can be registered by a bellows or diaphragm in the thermostat housing for controlling the oven temperature. This thermostat may be of any suitable hydraulic type, but I prefer to use a thermostat of the general type disclosed in the United States patent to W. J. Ettinger, No. 2,260,014, dated October 21, 1941. A heat shield 51 cooperates with the bulb and is capable of sliding action over the bulb so as to insulate the bulb from the high heat cleaning temperatures. Hence, the temperature of the shielded bulb never rises above about 600° F. although the temperature within the oven cavity will reach a range between 750° F. and 950° F. which is the temperature range at which the heat cleaning operation is most effective.

As is best seen in FIGURES 1 and 3, the heat shield 51 is suspended from a pair of overhead guide rails 52 which overlie both the bulb and the shield. FIGURES 1 and 2 illustrate the shield in one extreme position namely during normal cooking where the thermostat bulb 50 is exposed and the oven temperatures are not expected to rise above about 550° F. FIGURE 3 shows the shield in its other extreme position where the shield completely covers the bulb and isolates the bulb from the high oven temperature. While the shield 51 intercepts the heat before it reaches the bulb, the heat must be withdrawn from the shield by a cooling means or heat sink before the heat can reach the bulb. Such a cooling means for the shield is represented by a cooling fin 53 that is supported on the back of the oven liner over the opening in which the bulb 50 is supported so that the shield and cooling fin are in heat transfer relation when the shield covers the bulb as seen in FIGURE 3. It is well to provide a firm metal connection between the shield 51 and cooling fin 53 so that the heat from the shield may be conducted quickly to the outside of the oven liner. In order to allow normal manufacturing tolerances, the cooling fin is resiliently mounted on the back wall 23 of the oven liner by means of bolts 54 and coil springs 55. The bolts are used to guide the movement of the cooling fin and the springs serve to press the cooling fin tightly against the oven liner. The free end of the bulb 50 is supported by a cantilever support member 56 that is clamped at one end to the bulb while its opposite end is in sliding engagement with the interior of the shield 51. A better understanding of the construction and action of the shielding means for the thermostat bulb 50 may be had by referring to the copending Eff application Serial No. 48,002.

As previously mentioned, it is imperative to lock the oven door 16 before the heat cleaning cycle is initiated as well as to provide suitable thermal interlocks (not shown) to prevent the opening of the door until the heating elements are deenergized and the temperature drops to a safe degree within the normal cooking temperature range. In order to latch the door I have provided an elongated camming plate or keeper 60 that is fixed on the top edge of the oven door for cooperation with a horizontally disposed toggle lever 61 that serves as the latch for the door. The toggle lever 61 is illustrated in FIG. 1 as extending through a slot 62 in the front of the range body and through the fiberglass insulation 27, although it will be recognized that the lever at its center could have been brought up vertically through the insulation and through the range body and extending below the cooking top 11 so as to be free of any interference from the insulation. This however is a matter of designer's preference and the drawing as submitted is sufficient to show one modification of a mechanism for controlling the locking of the door and the movement of the shield 51 for the thermostat bulb 50. In the plan view of FIGURE 2, the toggle lever 61 appears as a straight link member although in side view of FIGURE 1 it is seen as having an offset portion at the center as at 63. This is for two principal reasons; namely, so that the latching portion of the lever will be positioned above the top edge of the door while the pivotal portions of the mechanism will be relatively short and closely adjacent the top wall 22 of the oven liner.

There is a fixed bracket member 64 fastened on the top of the oven liner over a circular opening 65 which receives a shaft 66 of an offset bell crank lever 67. The bell crank lever 67 has a lower arm 68 fastened to the bottom of the vertical shaft 66 and an upper arm 69 fastened at the top of the shaft. The lever 67 is supported for pivotal movement by the bracket 64 in the opening 65 to rotate about the vertical axis of the shaft 66. The free end of the lower arm 68 of the bell crank lever is pin connected within a transverse elongated slot 70 in the top wall of the shield 51 as is best seen in FIGURE 2. Likewise the upper arm 69 of the bell crank lever is pivotally connected to the mid-portion 71 of the toggle lever 61. The innermost end of the toggle lever 61 includes a downwardly extending finger or guide pin 72 which is confined in an elongated slot 73 in the top wall 22 of the oven liner so that the toggle lever 61 and the upper arm 69 of the bell crank lever operate as a toggle joint, as best seen in FIGURES 2 and 3 of the drawing. One extreme position is shown in FIGURE 2 with the shield 51 exposing the bulb 50 while the other extreme position is shown in FIGURE 3 where the shield 51 completely covers the bulb 50.

Attention is directed to a handle 74 of the toggle lever 61 and its T-shape profile shown in FIGURE 1 for cooperation with the track of the cam 60 that is fixed to the top edge of the door. It is clear that when the toggle lever 61 is thrown from the left extreme position of FIG. 2 to the right extreme position shown in FIGURE 3, the cam track will cause the door to press firmly against the range body and tend to flatten the gaskets 33 and 34 mounted on the breaker frame of the oven liner. Also it will be appreciated that as the toggle lever or latch is actuated the lower arm 68 of the bell crank lever will automatically shift the shield 51 with relation to the thermostat bulb and insure that the bulb will be protected whenever the oven door is locked in preparation for the heat cleaning cycle. This insures that the housewife will not neglect to cover the bulb before the cleaning cycle is begun.

Having described above my invention of a safety means combining the movement of the shield for the thermostat bulb with the movement of the door latching mechanism it will be readily apparent to those skilled in this art that I have provided a simple mechanism which is both easy to manufacture and reliable in operation leaving nothing to chance as to whether the bulb will be properly protected during the heat cleaning cycle.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A thermostatic control system for controlling the heating means of a domestic oven in two temperature ranges having a normal cooking range and a higher heat cleaning range, said control system comprising a thermostatic bulb positioned within an oven, a temperature responsive fluid filling said bulb for controlling said heating means responsively to the expansion and contraction of the fluid, and protective means for preventing excessive temperature rise in said fluid including shielding means which is movable over the thermostat bulb before the temperature within the oven is made to rise above the normal cooking temperature, said oven including a door for gaining access thereto, a door latching means supported from the oven and joining the shielding means at one end and the door at the other end whereby when the latch is moved to lock the door in preparation for raising the oven temperature above the normal cooking temperature the shielding means will automatically cover the thermostat bulb and vice versa.

2. A domestic oven comprising an oven liner and a front opening door, a heating means for the oven, and a thermostatic control system controlling the heating means in two temperature ranges including a normal cooking range and a higher heat cleaning range, a thermostatic bulb positioned within the oven liner, the bulb containing a temperature responsive fluid for controlling said heating means responsively to the expansion and contraction of the fluid, and shielding means movably mounted within the oven liner so that the bulb is uncovered when the oven temperature is in the normal cooking range, the shielding means being placed over the bulb before the temperature in the oven is made to rise above the normal cooking temperature, a door latching means supported from the oven and being adapted to lock the door shut before the oven temperature rises to the heat cleaning range, the latching means being connected to the shielding means whereby the bulb is automatically covered by the shielding means when the door is latched, and alternately the shielding means is removed from the bulb when the door is unlatched.

3. A domestic oven as recited in claim 2 wherein the oven door is a front opening drop door that includes a camming surface on its top edge for cooperation with the door latching means, the thermostat bulb being supported from the back wall of the oven liner and projecting toward the front door, the shielding means extending in line with the thermostat bulb for reciprocating movement to either cover the bulb or expose the bulb depending on the setting of the door latching means.

4. A domestic oven as recited in claim 3 wherein the door latching means includes a toggle lever for actuating a bell crank lever, one extreme position of the toggle lever causing the shielding means to retreat from the bulb while the opposite extreme position of the toggle lever will move the shielding means over the bulb at which time the door will be latched by the said toggle lever.

References Cited in the file of this patent

UNITED STATES PATENTS

| | | |
|---|---|---|
| 2,224,945 | Ames | Dec. 17, 1940 |
| 2,247,626 | Ames | July 1, 1941 |